O. L. KOSCHERAK.
SIPHON HEAD.
APPLICATION FILED JAN. 12, 1909.

934,819.  Patented Sept. 21, 1909.

WITNESSES:
William Miller
Christian Almstaedt

INVENTOR
Otto L. Koscherak
BY
W. C. Hauff
ATTORNEY

UNITED STATES PATENT OFFICE.

OTTO L. KOSCHERAK, OF NEW YORK, N. Y.

SIPHON-HEAD.

934,819.  Specification of Letters Patent.  Patented Sept. 21, 1909.

Application filed January 12, 1909.  Serial No. 471,893.

*To all whom it may concern:*

Be it known that I, OTTO L. KOSCHERAK, a citizen of the United States, residing at New York, in the county of New York and State of New York, have invented new and useful Improvements in Siphon-Heads, of which the following is a specification.

This invention relates to improvements by which a siphon head can be provided with a series of valves or packings which prevent leakage by forming a tight closure.

This invention is set forth in the following specification and claim and illustrated in the annexed drawing in which:—

Figure 1:
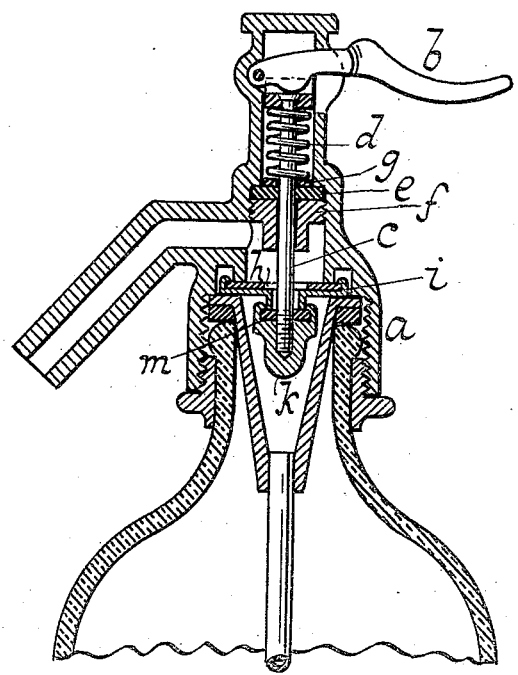
Figure 2:
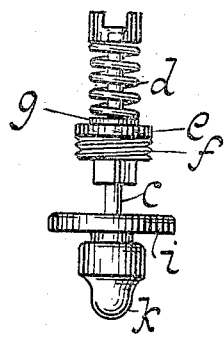
Figure 3:
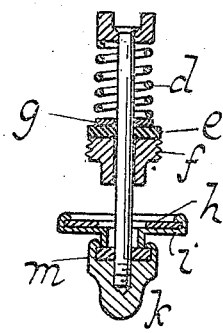

Figure 1 shows a central sectional elevation of a siphon head embodying this invention. Fig. 2 shows a detail view of a valve stem with packings. Fig. 3 is a central longitudinal section of Fig. 2.

In this drawing is shown a siphon head shell $a$ cast or formed in the usual well known manner and having a lever $b$ fulcrumed thereto. The lever acts upon a valve spindle $c$ to depress the same and a spring $d$ restores the spindle when the lever $b$ is released.

The shell $a$ has a seat or shoulder against which sits a valve or packing $e$ of rubber and a nut $f$ engaging a screw thread in the shell $a$ will tighten or expand the packing $e$ so as to cause the same to tightly clasp the spindle $c$. If the packing $e$ is loose or worn the nut $f$ being suitably tightened or screwed home will cause the packing $e$ to expand or close to its seat and tightly surround the spindle $c$.

If the spindle should be loose or out of line the expanding of packing $e$ will center or aline the spindle and any leakage or escape of air past or through the packing $e$ will be cut off by such tightening of the packing. The nut $f$ can be screwed into place by any suitable key or tool made to temporarily engage the same. A metallic washer $g$ placed on the packing $e$ supports the returning spring $d$.

The spindle $c$ is extended through the washer $g$ and packing $e$ and nut $f$ and also through a second packing $h$ sitting or closing against a shoulder or seat in the shell $a$ below the nut $f$. The packing $h$ is combined with a metallic disk part into which the rubber portion of the packing is inserted and about which the metallic disk is spun.

The spindle $c$ at its lower part carries the valve $k$ having packing $m$ which sits or closes tightly against the metallic disk $i$ or against the shoulder or seat surrounding or located at the central portion of disk $i$ and through which central opening the spindle $c$ passes.

When the lever $b$ is depressed the valve $k$ is moved away from the seat or disk $i$ and contents from the bottle can escape.

When the parts shown in Fig. 2 are assembled in the shell $a$ the spring $d$ closing the washers or valves $h$ and $c$ $m$ and $k$ to their seats and the nut $f$ holding the washer $e$ to its seat a tight closure is obtained which can be tested by the so called mouth test or suction through the spout of shell $a$. The nut $f$ tightening the packing $e$ to its seat and to the spindle will prevent leakage through the rubber packing around the spindle and at the same time a firm support is obtained for the packing $e$ the metal washer $g$ and the spring $d$. The benefit of this is that when through the continued movement of the spindle the rubber packing is loosened or its center hole enlarged and the head leaks past the lever the washer $e$ can be expanded and made to form a close seal, without its being necessary to change the rubber packing which is a frequent cause of annoyance or repair in a great number of siphon heads now in use.

The disk $i$ can be a flat aluminum plate into which the rubber packing is inserted and spun in and this disk $i$ acts as a seat for the support of valve $k$ or its packing. This plate $i$ being placed above valve $k$ also enables the head or shell $a$ to be tested before being placed onto the bottle. The valve $k$ screwed to spindle $c$ governs the inlet and outlet of the siphon head and holds the plate $i$ with washer $h$ to its seat.

This invention is particularly useful in such heads the shell of which is cast in one piece as it avoids the necessity of placing at the top of the head shell the customary metal cap.

What I claim is:—

A siphon head having its bore formed with a circumscribing seat and with a depending annular shoulder overhanging said seat and concentric therewith, a combined disk and packing ring having its edge portion extending into said seat, said disk being formed with an upstanding peripheral flange crimped over the packing ring and disposed between said shoulder and the wall of said seat, a spindle extended through said combined ring and disk and provided with a valve, and means for yieldingly holding said valve in contact with said disk.

In testimony whereof I have hereunto set my hand in the presence of two subscribing witnesses.

OTTO L. KOSCHERAK.

Witnesses:
HERM. EGEL,
CHRISTIAN ALMSTAEDT.